United States Patent [19]
Foote

[11] Patent Number: 6,164,853
[45] Date of Patent: Dec. 26, 2000

[54] ERGONOMIC HOUSING FOR A HANDHELD DEVICE

[76] Inventor: Lisa L. Foote, 12329 Creek Mill Pl., Richmond, Va. 23060

[21] Appl. No.: 09/392,250

[22] Filed: Sep. 9, 1999

[51] Int. Cl.[7] ............................................... B41J 5/08
[52] U.S. Cl. ............................ 400/489; 400/472; 400/88
[58] Field of Search .................................... 400/489, 486, 400/472, 477, 485, 479, 87, 88; 341/22, 21; D14/114, 115; 200/5 R; 235/145 R; 345/169, 168

[56] References Cited

U.S. PATENT DOCUMENTS

| D. 413,360 | 8/1999 | Smith .................................... D21/333 |
| 5,267,181 | 11/1993 | George ................................. 364/702.12 |
| 5,332,322 | 7/1994 | Gambaro .................................. 400/489 |
| 5,432,510 | 7/1995 | Matthews .................................. 341/20 |
| 5,512,892 | 4/1996 | Corballis et al. .......................... 341/22 |
| 5,604,493 | 2/1997 | Behlke ..................................... 341/22 |
| 5,805,256 | 9/1998 | Miller ..................................... 348/734 |

OTHER PUBLICATIONS

Brother International, "P–Touch Home & Hobby", Damark. p. 32, Jul. 1997.

Primary Examiner—John S. Hilten
Assistant Examiner—Anthony H. Nguyen
Attorney, Agent, or Firm—Shanks & Herbert

[57] ABSTRACT

An ergonomic housing for a handheld device is provided. The device includes an ergonomic housing that is shaped to fit comfortably in the palm of a human hand, while simultaneously allowing fingered tactile operation of a set of key members on the face and lateral portions of the housing. The device is particularly useful for one-handed operation of portable devices utilizing a keypad where operation of such a device using two hands is not desirable. The position of keys on the housing facilitates minimal movement of both the fingers and thumb of the operator to operate the keys of the device. Such manipulation of keys may also be accomplished completely by touch, due to the uniquely shaped keys strategically placed in rows on the housing face within close proximity of the operator's natural finger positions and additional keys placed within close proximity of the operator's natural thumb position. An integral strap enables an operator to maintain control of the device without being forced to maintain a constant grip on the housing. The device may be used as, for example, a remote control, portable telephone, pager, or calculator.

16 Claims, 6 Drawing Sheets

ERGONOMIC HOUSING FOR A HANDHELD DEVICE

BACKGROUND OF THE INVENTION

1. Field of the Invention

The present invention relates to a biomechanically improved device for handheld use. More particularly, the present invention relates to an improved, ergonomic housing for handheld devices including, but not limited to, remote controls, telephones, pagers and calculators. The ergonomic device includes both left- and right-handed embodiments, based upon an operator's preference, and is adaptable to a wide range of hand sizes.

2. Description of Related Art

The increasingly popular use of handheld electronic devices is due to many factors, including the technological advances in processor computing power and miniaturization of such powerful processors. These technological advances have yielded devices of decreased dimensions, such as cellular telephones, calculators, remote controls, pagers and other similar devices incorporating keypads. Currently, there are available some of these types of convenient devices which are small enough to fit within a shirt pocket.

Electronic handheld devices which incorporate a keypad for numerical or text entry and/or bidirectional communication are extremely popular consumer items. However, such devices are not limited to telephones and text-based pagers. Rather, consumers continue to purchase handheld items for use in operating audio and visual equipment via remote control. For example, virtually all currently available models of televisions (TVs), video cassette recorders (VCRs), digital video disc players (DVDs), and associated stereo components are supplied with a handheld remote control. Such remote controls enable a user to operate a TV, VCR, DVD, stereo component, and the like, from the comfort of the user's chair or sofa, thereby eliminating a need to physically interact with the main electronic unit itself.

Along with the development of handheld devices in general, the need has arisen for such devices that are ergonomically shaped. One of the key advantages of ergonomic handheld devices is that they minimize the stress on the operator's arms, hands and wrists that are associated with operation of non-ergonomic devices. Also, a device that is shaped to nest comfortably within the user's hand is easier to hold for extended periods of time as compared to a bulky article that requires a positive grip on the device in order to manipulate the keypad. Further, an ergonomic handheld device that is operable via sense of touch only would be even more advantageous, such as if a user necessarily operates the keypad in low light conditions or during activities requiring a significant amount of the operator's attention, such as when operating a motor vehicle.

U.S. Pat. No. 5,332,322 ("the '322 patent") illustrates an attempt in the art to address the issue of ergonomic devices. The claimed device in the '322 patent allegedly minimizes hand, wrist and finger fatigue associated with operating conventional keyboards. However, in the '322 patent, the device requires a constant grip on the device while activating the keys on a recessed keypad via the operator's thumb only. Accordingly, the '322 patent severely limits itself to thumb-actuated keyboards coupled with a simultaneous requirement of an operator's constant grip on the device.

Accordingly, there is a need to provide an ergonomic device for handheld use that overcomes one or more of the deficiencies of those devices currently used.

SUMMARY OF THE INVENTION

It is, therefore, an object of the present invention to provide an ergonomic housing for handheld devices in which one or more disadvantages of the prior art are overcome.

In accordance with this objective, there is provided in accordance with the invention a handheld apparatus housing, comprising: a front planar surface; a rear planar surface opposite said front planar surface; an upper surface interposed between the upper portion of said front planar surface and the upper portion of said rear planar surface of said housing; a lower surface interposed between the lower portion of said front planar surface and the lower portion of said rear planar surface of said housing; a keypad comprised of a plurality of keys on said front planar surface, said keys arranged in one or more horizontal rows along said front planar surface; and a plurality of radial ergonomic grooves arranged between said upper portion and said lower portion and along an edge of said apparatus, horizontally aligned with said rows of said keys.

Further objects, features, and advantages of the invention will become apparent from the detailed description that follows.

DETAILED DESCRIPTION OF PREFERRED EMBODIMENTS

Figure 1:
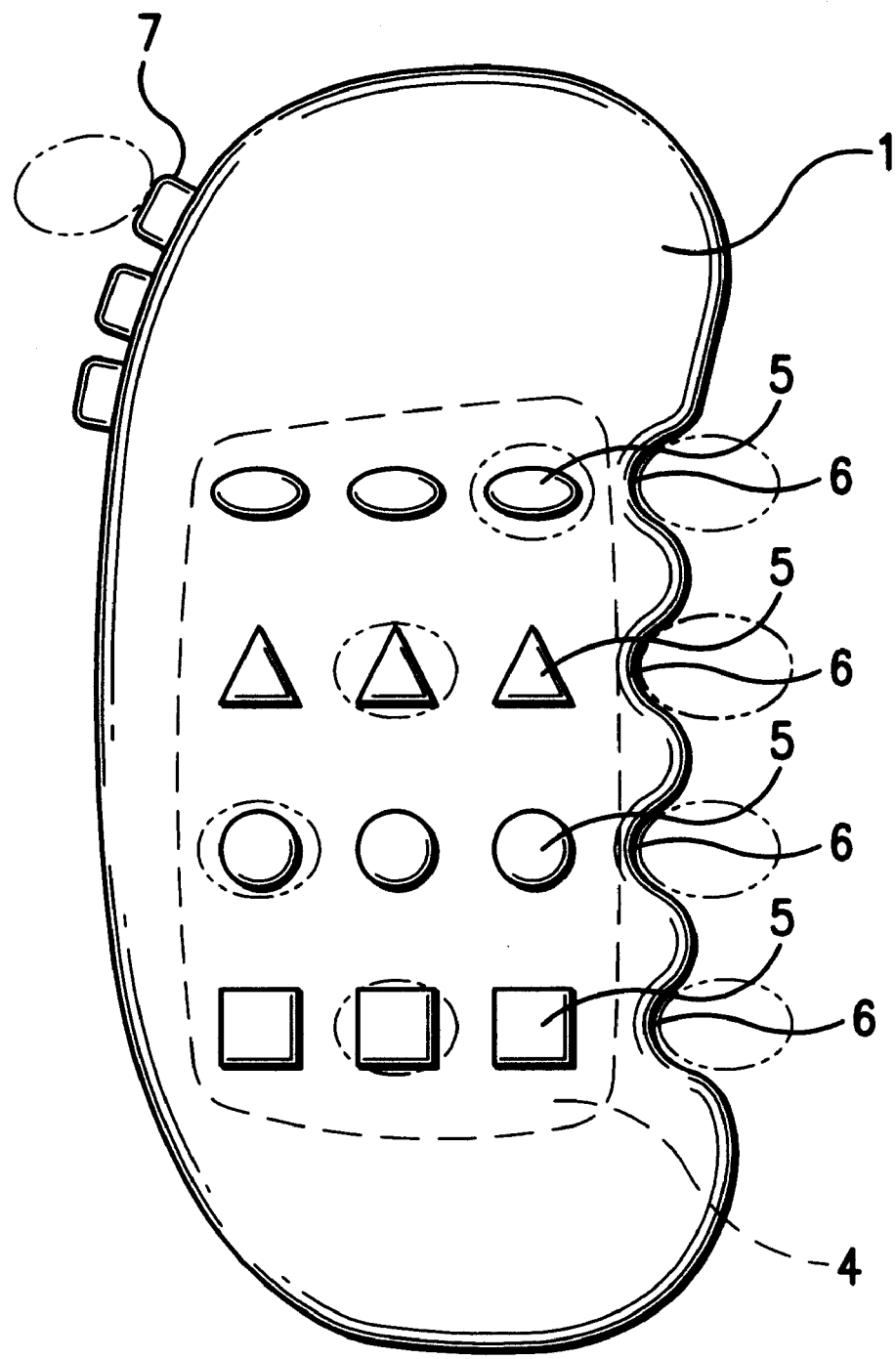
FIG. 1 illustrates a front plan view of a handheld ergonomic device in accordance with the invention.

The present invention provides an ergonomic housing for a handheld device. In the housing, the operator's fingers naturally curve around the device, due to the presence of radial grooves in the side edge of the device that accommodate an operator's fingers without impinging on these fingers as they naturally surround the device. The device has a width allowing for the operator to grasp the housing and depress the keys at the same time. See, for example, FIG. 2 and 3.

The device includes keys strategically arranged in horizontal rows, whereby the keys within a row are similarly shaped, with each row or each adjacent row containing a different shape common to the keys of that particular row. For example, the keys in the uppermost row may be comprised of round keys, with the next lower row comprised of square keys, the next lower row of triangular keys, and the lowest row of oval keys. These keys thus enable an operator to intelligently operate the keys by sense of touch alone.

In a second embodiment of the present invention, the handheld apparatus housing previously described comprises a front planar surface wherein the keypad comprises at least two adjacent rows of keys, with each row of keys uniquely shaped in comparison with at least one immediately adjacent row of keys, so that a user may differentiate by touch, adjacent rows of unique keys.

Further, in operating the keypad, the operator's fingers need only move in a linear horizontal direction across the face of the keypad, without requiring any vertical movement. Accordingly, each finger can operate a single horizontal row of keys, minimizing finger movement along the entire face of the keypad.

The housing also may include at least one actuator key lying directly beneath the natural position of the operator's thumb, so that the operator's thumb rests comfortably on the device. The additional thumb-actuated key(s) may also comprise distinctly shaped keys, further enabling touch-sensitive operation of the device.

The ergonomic housing incorporates uniquely shaped keys for operation by touch on tactile-indicative keys. Such tactile-indicative keys are uniquely shaped to enable an operator to identify the specific keys by sensing the shape of the key without resorting to visual means for manipulating the keys. These keys may be activated while the operator's fingers are in a naturally curved holding position.

The ergonomic housing is shaped to comfortably reside in a human hand, while facilitating ease of manipulation in operating the incorporated keypad and/or peripheral actuator keys. The device housing nests within the palm of the operator's hand, thus facilitating ease in operating and transporting the device.

In an embodiment, the operator may control the device without requiring a constant gripping action on the particular device. This can be accomplished by incorporating a strap into which an operator may insert his or her hand on the rear of the device housing. The operator inserts his or her hand into the strap with the palm of the hand contacting the housing, so that the strap firmly engages the back of the operator's hand. Accordingly, the operator may still maintain control over the device while his fingers and thumb are in a relaxed (i.e., non-gripping) position.

The invention will now be described in more detail by way of example with reference to the embodiments shown in the accompanying figures. The following described embodiments are only presented by way of example and should not be construed as limiting the inventive concept to any particular physical configuration.

Figure 4:
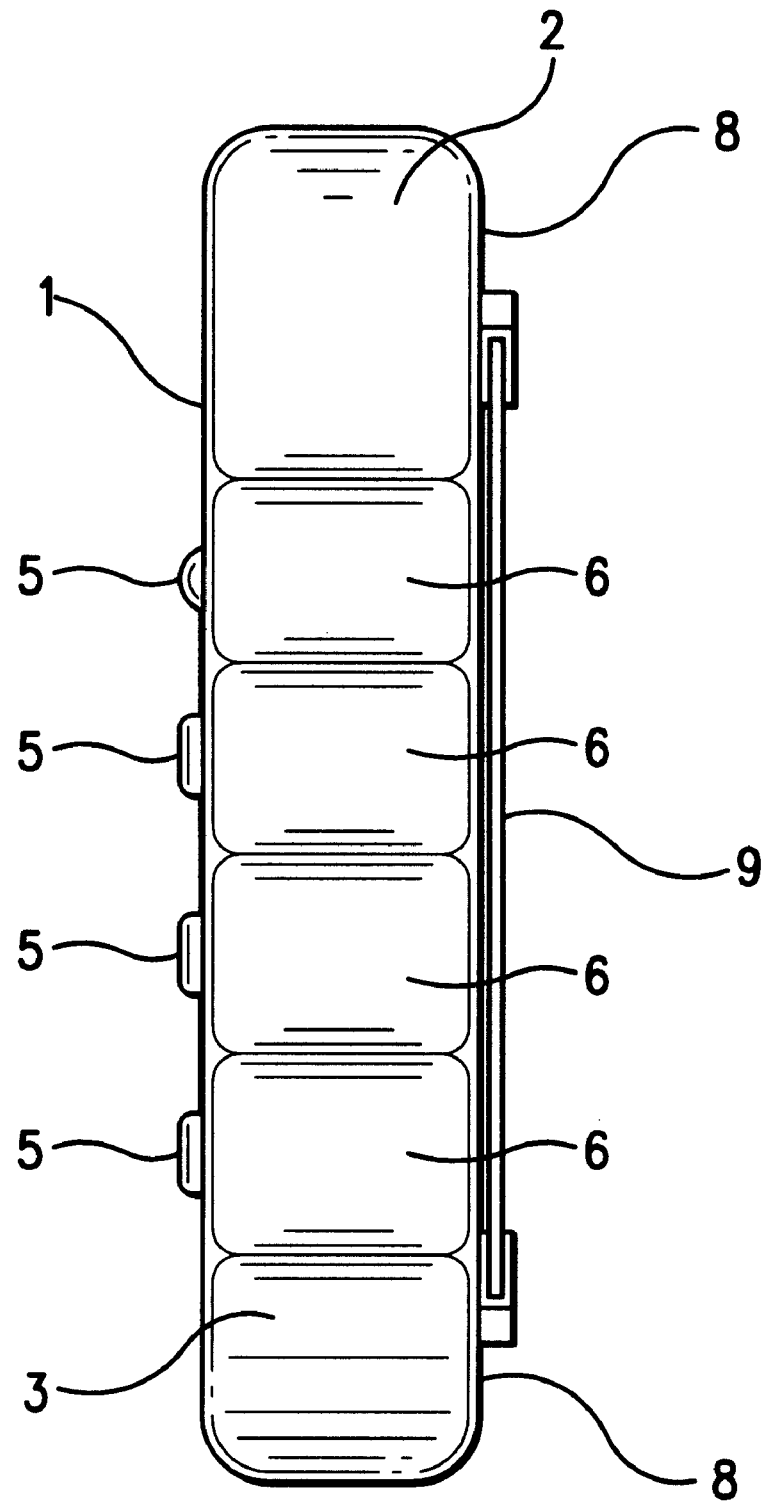
FIG. 4 illustrates a right plan view of a device in accordance with the invention.

FIG. 1 shows a front plan view of a handheld apparatus housing according to the invention. The housing includes a front planar surface 1 and a rear planar surface 8 (See FIG. 4) opposite the front planar surface. As seen in FIG. 4, the housing includes an upper surface 2 interposed between the upper portion of the front planar surface 1 and the upper portion of the rear planar surface 8. The housing also includes a lower surface 3 interposed between the lower portion of the front planar surface 1 and the lower portion of the rear planar surface 8. See FIG. 4.

The housing includes a keypad 4 including a plurality of keys 5 on the front planar surface 1 of the housing. The keys 5 are arranged in horizontal rows along the front planar surface. One or more rows can be present, with each row containing one or more keys. Generally, at least two rows with at least two keys in each row will be present. Each key in the same row has the same unique shape. For example, as shown in FIG. 1, the keys of the first row are oval, the keys of the second row are triangular, the keys of the third row are circular, and the keys of the fourth row are square.

The housing includes a plurality of radial ergonomic grooves 6. There is a groove for each row of keys. For example, as shown in FIG. 1, there are four rows of keys and four grooves. The grooves are adjacent to a specific row of keys as shown in FIG. 1.

The housing may also include one or more buttons 7 moveably mounted on the upper surface for triggering by a person's thumb.

Figure 2:
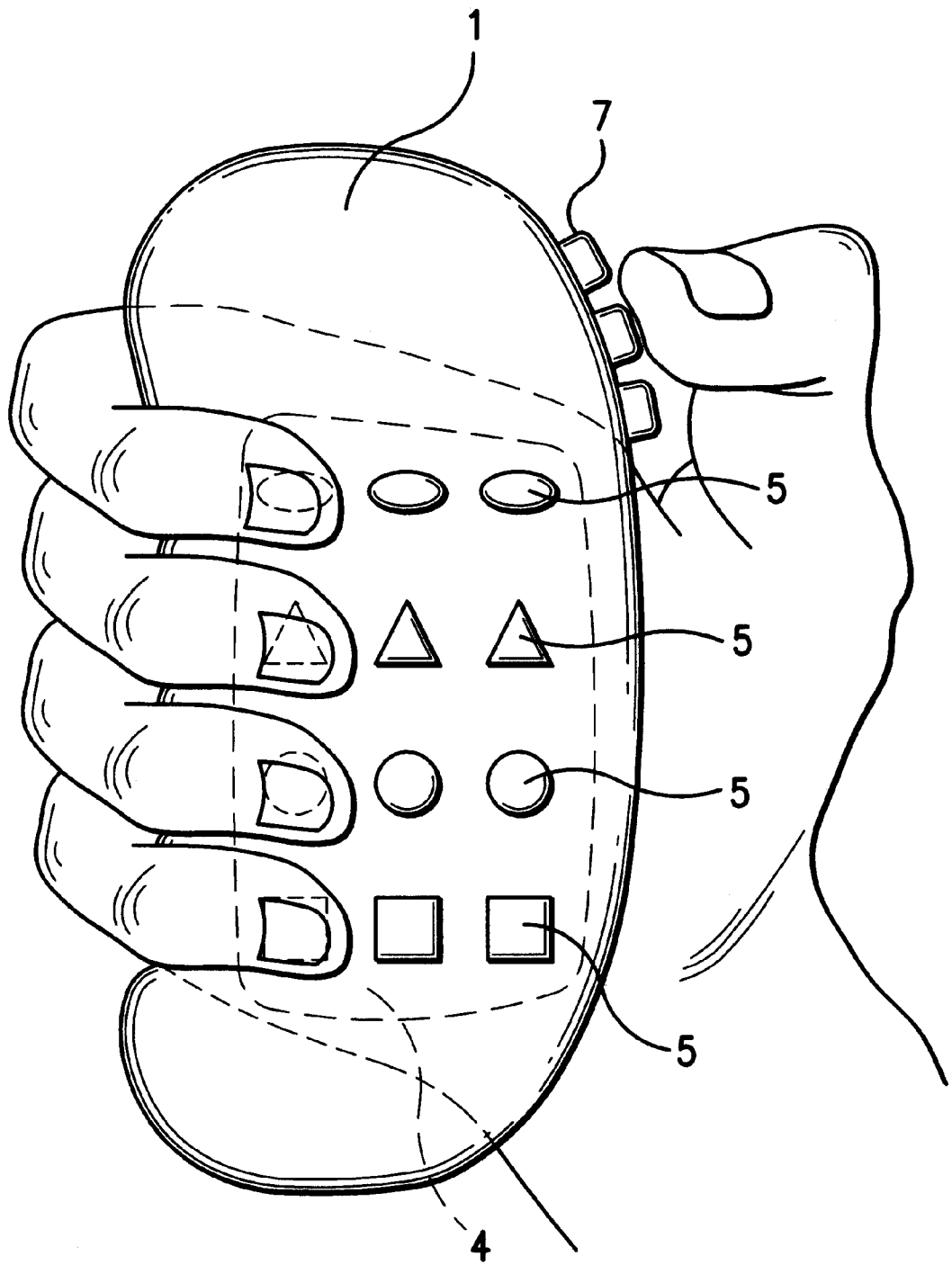
FIG. 2 illustrates a front plan view of a handheld device in use by a right-handed operator.
Figure 3:
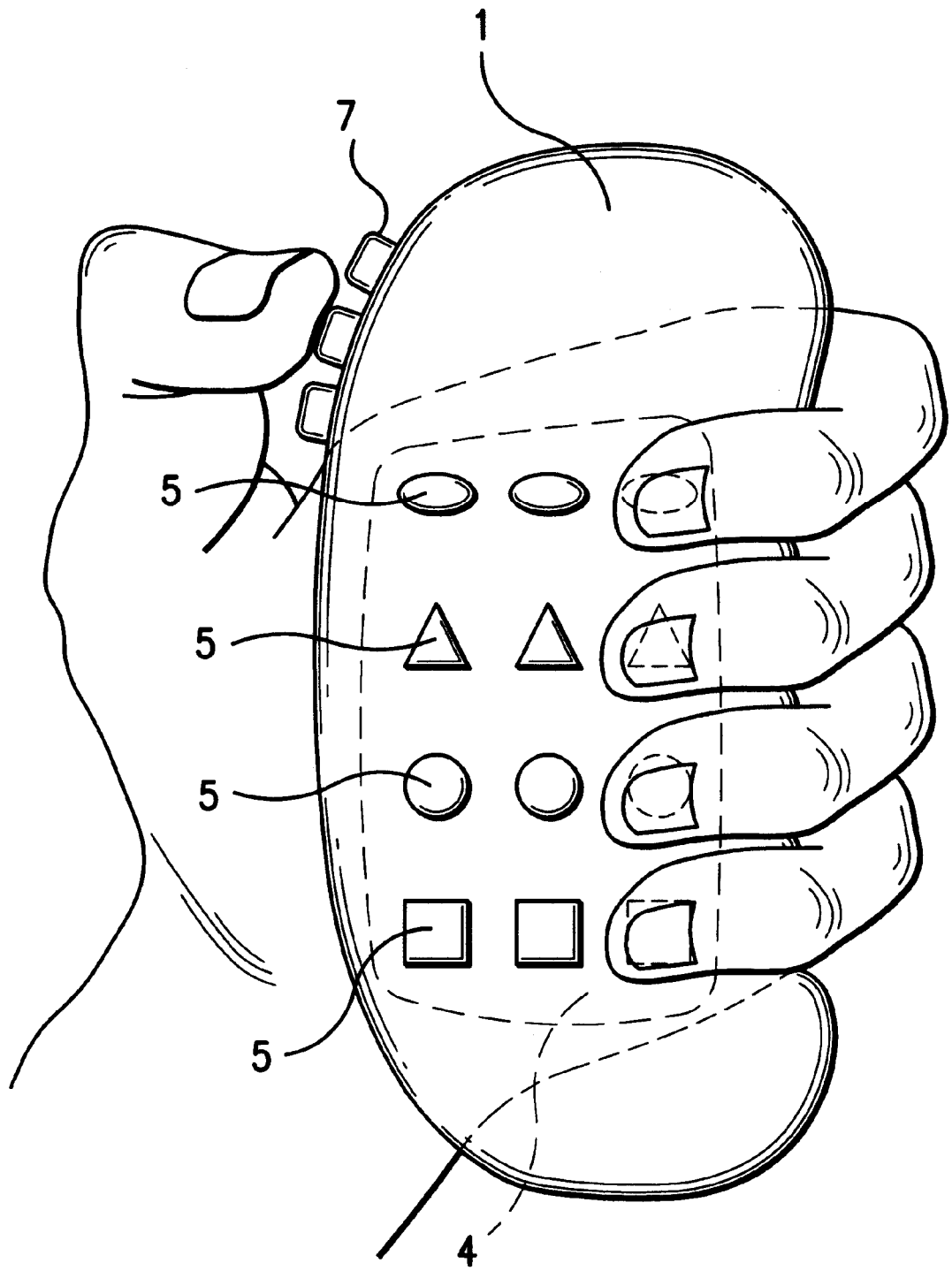
FIG. 3 illustrates a front plan view of a handheld device in use by a left-handed operator.
Figure 5:
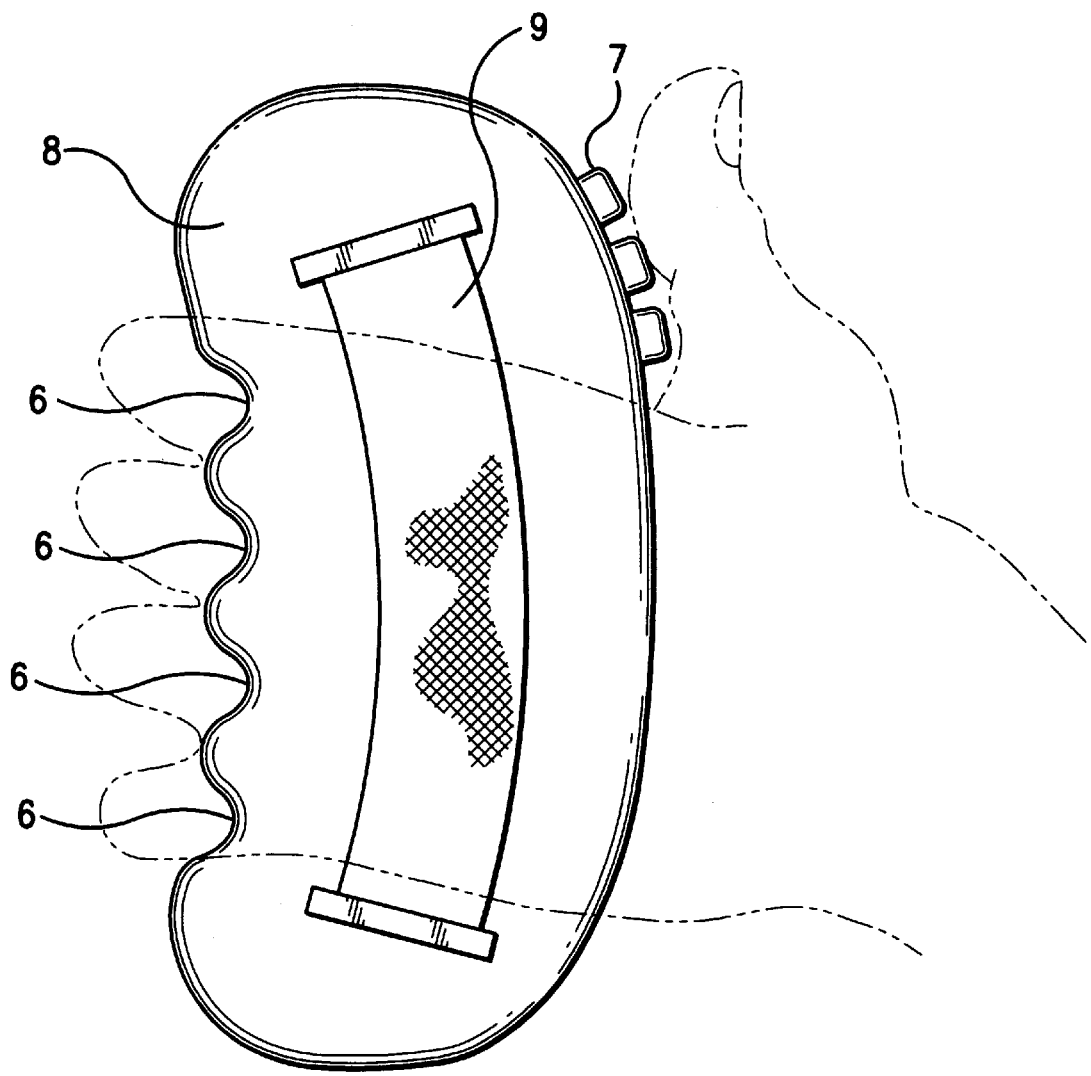
FIG. 5 illustrates a back plan view of a handheld device including a strap attachment according to the invention.

FIG. 2 shows the device of FIG. 1 adapted for use by a right-handed person. FIG. 3 shows the device of FIG. 1 adapted for use by a left-handed person. FIG. 5 is a side view of the device of FIG. 1.

Figure 6:
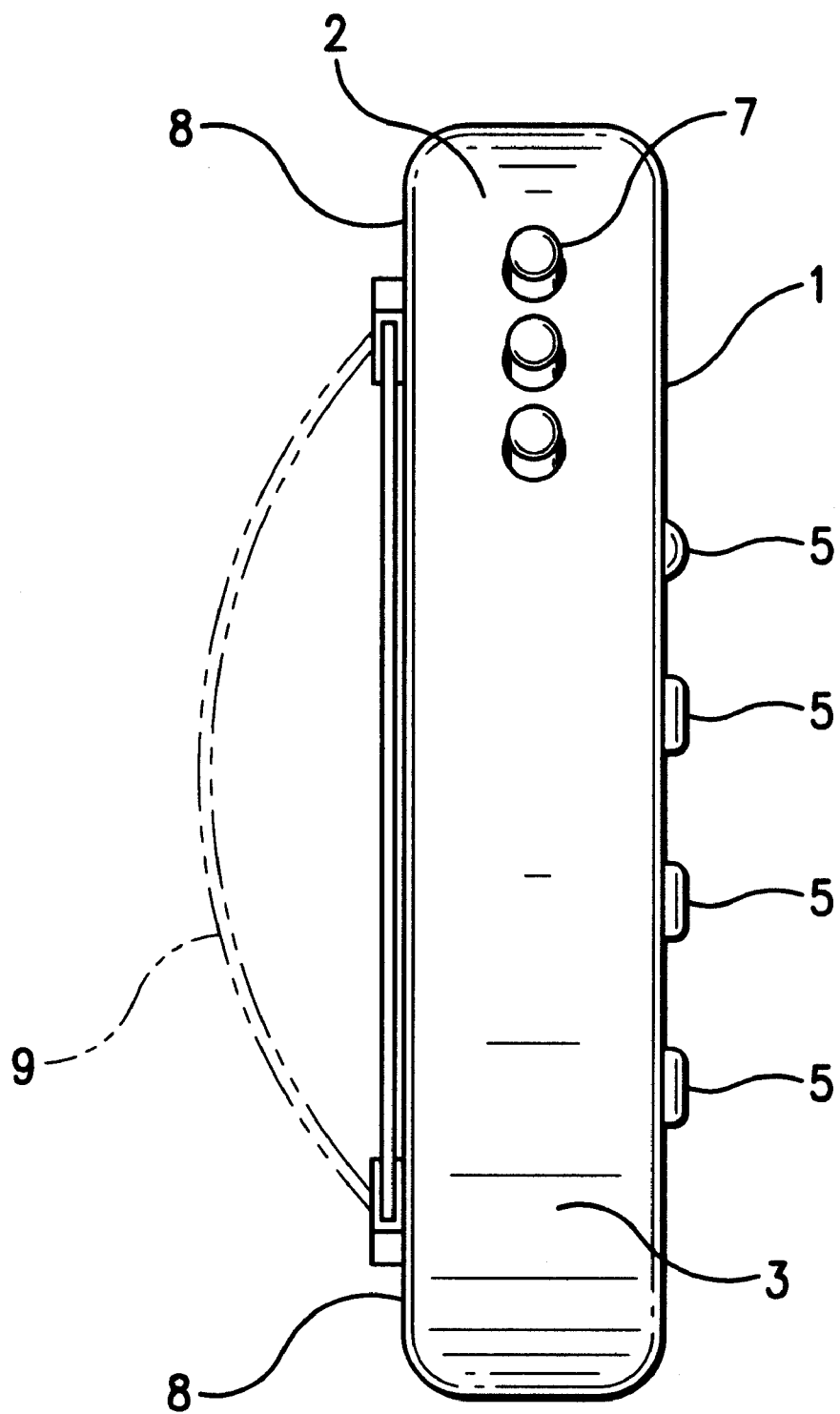
FIG. 6 is a right plan view of the device of FIG. 5.

FIG. 5 shows a back plan view of an embodiment of the invention that includes a holding member 9 attached to the housing. FIG. 6 shows a side plan view of FIG. 1. The holding member can be an elastic strap or other member which allows for a person to insert his hand, thereby allowing one to hold the device in a relaxed position, without having to constantly grip the device.

It will be understood that the above described embodiments of the present invention are susceptible to various modifications, changes, and adaptations, and the same are intended to be comprehended within the meaning and range of equivalents of the appended claims. Further, although a number of equivalent components may have been mentioned herein which could be used in place of the components illustrated and described with reference to the described embodiment, this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A handheld apparatus housing, comprising:

a front planar surface;

a rear planar surface opposite said front planar surface;

an upper surface interposed between the upper portion of said front planar surface and the upper portion of said rear planar surface of said housing;

a lower surface interposed between the lower portion of said front planar surface and the lower portion of said rear planar surface of said housing;

a keypad comprising a plurality of keys on said front planar surface, said keys arranged in one or more horizontal rows along said front planar surface;

and a plurality of radial ergonomic grooves arranged between said upper portion and said lower portion and along an edge of said apparatus, horizontally aligned with said rows of said keys.

2. A housing according to claim 1, further comprising at least one key mounted on said upper surface for triggering by thumb.

3. A housing according to claim 1, which additionally comprises a holding member fixedly attached at said upper and said lower portions of said rear planar surface.

4. A housing according to claim 1, wherein said keypad comprises a plurality of numeric keys and at least one function key.

5. A housing according to claim 1, wherein each said row of said keys comprises uniquely shaped keys.

6. A housing according to claim 1, wherein each said row of said keys comprises a common shape, selected from the group consisting of:

oval, triangle, square and round.

7. A housing according to claim 1, wherein each said row of said keys is uniquely shaped, wherein a top row of said keys comprises keys selected from the group consisting of:

oval, triangle, square and round; and wherein a second row of said keys comprises keys selected from the group consisting of:

oval, triangle, square and round;

and wherein a third row of said keys comprises keys selected from the group consisting of:

oval, triangle, square and round;

and wherein a fourth row of said keys comprises keys selected from the group consisting of:

oval, triangle, square and round.

8. A telephone comprising a housing according to claim 1.

9. A calculator comprising a housing according to claim 1.

10. A pager comprising a housing according to claim 1.

11. A remote control comprising a housing according to claim 1.

12. A housing according to claim 2, wherein said holding member comprises elastic material.

13. A housing according to claim 1, comprising at least two horizontal rows of keys, and an ergonomic groove adjacent each of said horizontal rows.

14. A housing according to claim 2, wherein there are at least two keys having different shapes on said upper surface for triggering by thumb.

15. A housing according to claim 1, comprising four horizontal rows of keys and an ergonomic groove adjacent each of said horizontal rows.

16. A handheld apparatus housing, comprising:

a front planar surface:

a rear planar surface opposite said front planar surface;

an upper surface interposed between the upper portion of said front planar surface and the upper portion of said rear planar surface of said housing;

a lower surface interposed between the lower portion of said front planar surface and the lower portion of said rear planar surface of said housing;

a keypad comprising a plurality of keys on said front planar surface, said keys arranged in at least two horizontal rows along said front planar surface, wherein each said row of said keys comprises a common shape, and each said adjacent row contains a different common shape from said other adjacent row of said keys;

and a plurality of radial ergonomic grooves arranged between said upper surface and said lower surface and along an edge of said apparatus, horizontally arranged with said rows of said keys.

* * * * *